Feb. 16, 1960     D. A. HUGHES     2,925,485
SOLDERING APPARATUS
Filed Feb. 10, 1959
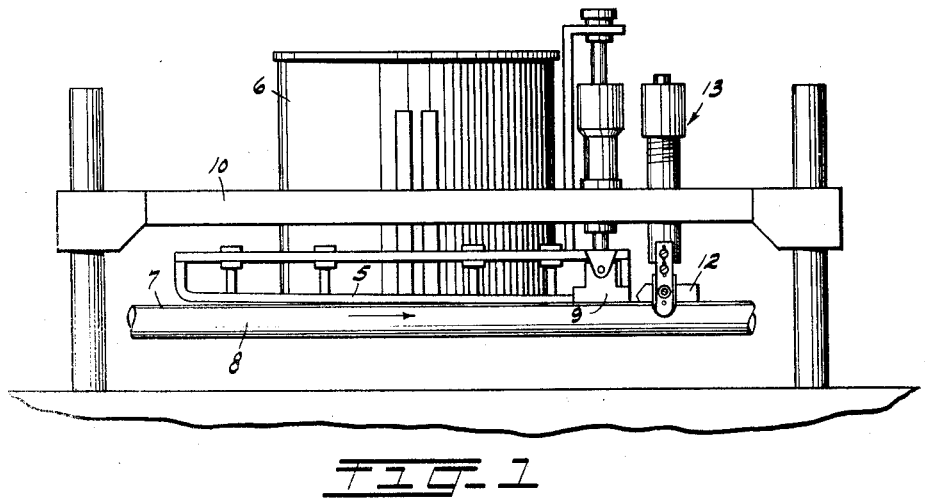
FIG. 1
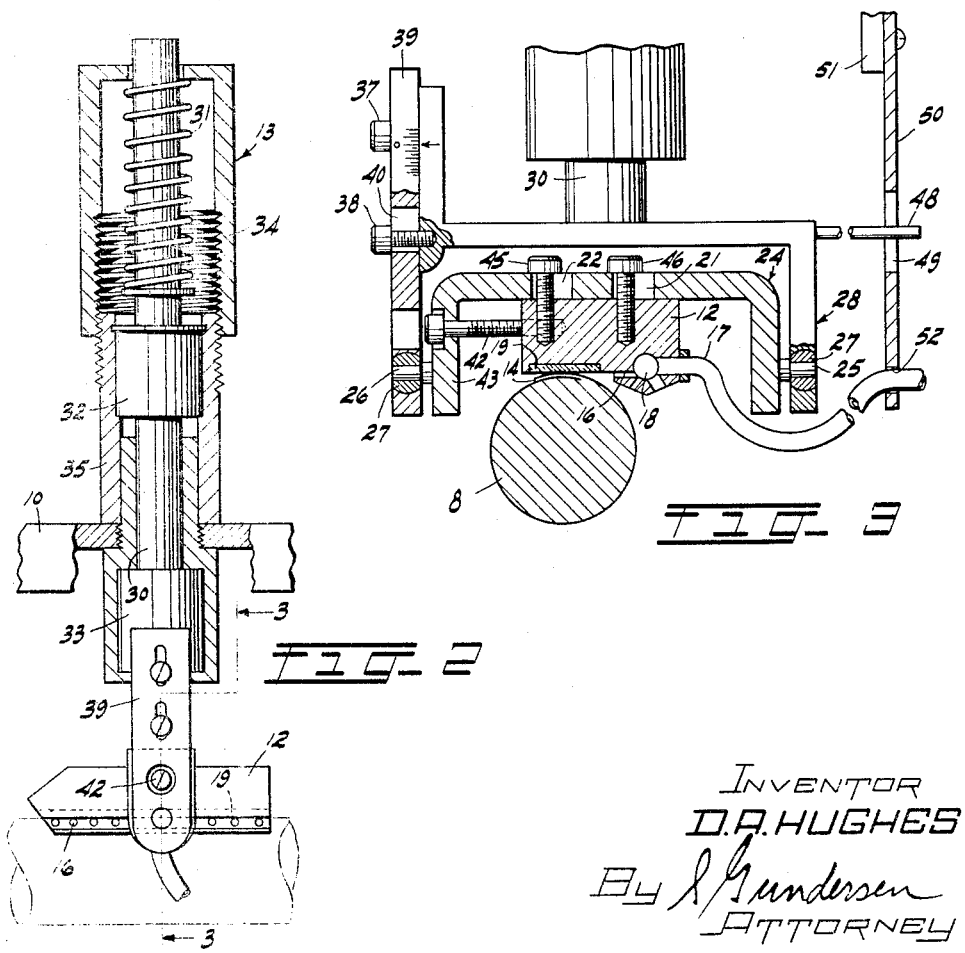
FIG. 2
FIG. 3
INVENTOR
D.A. HUGHES
By L. Gundersen
ATTORNEY

United States Patent Office 2,925,485
Patented Feb. 16, 1960

2,925,485

SOLDERING APPARATUS

David A. Hughes, Chatham, N.J., assignor to Western Electric Company, Incorporated, New York, N.Y., a corporation of New York Application February 10, 1959, Serial No. 792,350

7 Claims. (Cl. 219—9.5)

This invention relates to apparatus for soldering longitudinally extending seams in tubular articles, and particularly to a device for preventing relative movement between the soldered edges of the advancing articles while the molten solder is cooled and hardens.

In the fabrication of tubular articles such as the composite sheaths for telephone cables of the type disclosed in Patent 2,589,700, which issued March 18, 1952, to H. G. Johnstone, steel strip material is formed around an advancing cable core such that the edges of the strip material meet in overlapping relationship. Solder is fed between the edges and melted by exposure to the field of an induction heating coil of the type disclosed in Patent 2,801,316 to D. A. Hughes, which issued July 30, 1957. To prevent overheating of the cable core, it is passed through a cooling station adjacent the cable exit end of the soldering station where a coolant is sprayed over the seam. During the hardening of the solder, relative movement between the edges is prevented by one or more pressure shoes which ride on top of the advancing soldered seam. The shoe is pivotally supported about an axis perpendicular to and above the cable so that it can follow variations in the sheath.

It was found that in order to produce a uniformly high strength seam, substantially uniform pressure has to be applied along the middle of the overlap of the advancing seam during the hardening of the solder. Due to such factors as variation in friction between the strip material and the contacting surface of the shoe, wear on the shoe, and the deposition of dirt and other foreign matter on the sheath engaging surface, the friction moment on the shoe varies considerably causing it to rock about the pivot and occassionally vibrate or chatter. Such erratic behavior causes variations in the pressure applied on the seam during the hardening of the solder, making it difficult to produce seams of uniformly high strength.

The object of this invention is an improved apparatus for preventing relative motion between the edges of such seams until the solder has set.

In accordance with the general features of the invention, this object is achieved by supporting an improved pressure shoe for pivotal movement about an axis extending perpendicular to and tangent to the strip material at the seam. The moment of the frictional forces about the pivot is thereby reduced to zero and no spurious rocking will result from variations in the magnitude of the frictional component of the applied force.

According to an important feature of the invention, the shoe may be tilted and moved laterally with respect to the seam so that optimum direction and concentration of pressure may be produced thereon.

These and other features of the invention will be more fully understood from the following detailed description when taken in conjunction with the accompanying drawings, in which:

Fig. 1 is a front elevational view of a soldering station of a cable sheathing line incorporating the improved cooling shoe;

Fig. 2 is an enlarged front elevational view of the cooling shoe support structure, and Fig. 3 is a cross-sectional view of the cooling shoe and the support structure therefor as seen along the plane of line 3—3 of Fig. 2.

As seen in the drawing, particularly Fig. 1, a hairpin-shaped induction heating coil 5 connected to a transformer 6 is held over the longitudinally extending seam 7 of the sheath 8 of a cable advancing in the direction of the arrow. The coil is held in fixed spaced relation with respect to the seam in the cable by means of a shoe 9 resiliently supported from a fixed U-shaped support 10. The cooling shoe 12 is resiliently supported on the top of the cable sheath 8 by an adjustable spring tensioning device 13 to ride in pressure contact on the overlapping edge 14 of the sheath. The shoe is cooled by and disperses coolant fluid from apertures 16 over the seam, the coolant being supplied under pressure through a flexible tubing 17 connected to a chamber 18 extending through the length of the shoe into which the apertures 16 are connected. A glass or tungsten carbide plate 19 on the bottom of the cooling shoe provides a wear-resistant surface for riding on the sheath.

The cooling shoe 12 is secured to a yoke 24, having bearings 25 and 26 in spherical type races 27 in a second yoke 28. The yoke 28 is fixed to the lower end of a vertically movable cylindrical rod 30 which is normally biased by means of a spring 31 to urge downward pressure between the shoe 12 and the seam of the advancing cable sheath. The rod 30 rides in ball bearing races 32 and 33 which provide a low friction support therefor. The magnitude of the downward force exerted by the spring 31 may be varied as required for the size and type of material of the sheath by screwing cap 34 down on the threaded cylindrical housing 35 which is fixed to the U-shaped support 10. Springs of greater or lesser stiffness may be utilized in order to extend the range of the force. The applied force must be sufficient to prevent relative movement between the edges of the sheath but not so great that the solder is squeezed out of the seam.

In order to accurately direct the downward force on the seam so as to produce the strongest possible soldered joint, the tilt of the shoe may be varied by loosening screws 37 and 38 and moving member 39, of the yoke 28, vertically up or down as required, slots 40 being provided in the member 39 for the screws 37 and 38. For an optimum setting the contacting surface of the plate 19 should be tangent to and make contact with the middle of the overlapping portions of the edges of the sheath. For use with butt-type seams, the contacting surface should be tangent at the junction between the butting edges. Since the moment arm between the friction forces on the contacting surface of the plate 19 is zero, the friction forces produce only a thrust which is absorbed in the bearings 25 and 26 in the yoke which, in turn, are translated to the ball bearing races 32 and 33. Lateral adjustment of the shoe is made possible by means of an adjusting screw 42 extending through side 43 of yoke 24 into a threaded hole in the side of the shoe 12. To move the shoe laterally, screws 45 and 46, extending through elongated slots 21 and 22 in the midportion of the yoke 24, are loosened and the screw 42 turned to move the shoe 12 as desired, access to the head of the screw 42 being provided through a hole in the member 39. The screws 45 and 46 are thereupon tightened to hold the shoe 12 in place. It has been observed that if the downward force is applied to the outer edge of the seam, the seam will tend to open on the inside of the cable, while if the force is applied too far in from the edge, the seam will tend to open on the outside. With this tilt and lateral adjustment structure it is possible to direct the force with a high degree of accuracy and thereby improve the quality of the soldered joint.

The shoe 12 is prevented from twisting or rotating about the axis of the shaft 30 by means of a rod 48 extending from the back side (as seen in Fig. 1) of the yoke 28 which rides in an elongated aperture 49 in a guide bar 50 attached to the back flange 51 of the support 10. A hole 52 is provided in the lower portion of this guide bar for supporting the flexible tube 17 supplying the coolant to the shoe. The guide rod is made sufficiently long that the friction between the rod and the sides of the aperture 49 will be negligible and not interfere with vertical movement of the rod 30. Rotation could also be prevented by employing a ball bearing spline for the shaft 30.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In combination with apparatus for soldering a longitudinally extending seam between the edges of an advancing elongated tubular article where the seam is soldered in a soldering station and cooled, to set the solder, in a station adjacent the exit end of the soldering station, means in the cooling station for applying a force against the advancing edges of the article while the solder cools and sets, which comprises, a shoe having a wear-resistant surface for riding on the article for preventing relative motion between the edges thereof, a support for the shoe, means for mounting the support transverse to the advancing article for movement toward and away therefrom, means pivotally mounting the shoe in the support with the pivotal axis being perpendicular to the path of the advancing seam and tangent thereto, and resilient means for urging the shoe against the seam with a prescribed force.

2. Apparatus according to claim 1 wherein the support is a yoke and one side of the yoke is adjustable to vary the angular disposition of the wear-resistant surface of the shoe on the seam.

3. Apparatus according to claim 2 having means for moving the shoe laterally in the yoke to accurately direct the holding force applied to the seam.

4. In combination with apparatus for soldering a longitudinally extending seam between the overlapped edges of a longitudinally advancing tubular article, means for applying a holding force on the overlapped edge while the solder hardens, which comprises, a shoe mounted adjacent the exit end of the soldering apparatus for dispensing a coolant fluid on the heated seam, a support for the shoe, means for mounting the support for movement toward and away from the advancing article, means pivotally supporting the shoe in the support with the pivotal axis being perpendicular to the path of the advancing seam and tangent to the seam, and resilient means for urging the shoe against the seam with a prescribed force.

5. In combination with apparatus for soldering a longitudinally extending seam between the overlapped edges of a longitudinally advancing tubular article, means for applying a substantially constant holding force on the overlapped edge while the solder hardens, which comprises, a shoe mounted adjacent the exit end of the soldering apparatus for dispensing a coolant fluid on the heated seam, a yoke for the shoe, means for mounting the yoke transverse to the advancing article for movement toward and away therefrom, means pivotally supporting the shoe in the yoke with the pivotal axis being perpendicular to the path of the advancing seam and tangent to the seam, means for preventing rotation of the yoke, means for adjusting one side of the yoke to vary the angular disposition of the shoe with respect to the seam, means for moving the shoe laterally in the yoke to accurately direct the holding force applied to the seam, and resilient means for urging the shoe against the seam with a prescribed force.

6. In combination with apparatus for soldering a longitudinally extending seam between the overlapped edges of a longitudinally advancing tubular article, means for applying a substantially constant holding force on the overlapped edge while the solder hardens, which comprises, a fixed support, an elongated member resiliently mounted on the support, means for varying the degree of resilience of the elongated member on the support, low friction bearings for allowing longitudinal movement of the elongated member on the support toward and away from the article, means for restricting rotational movement of the elongated member on the support, a shoe having a wear-resisting surface for making sliding contact with the overlap portion of the seam, a yoke member mounted to an end of the elongated member, and means for pivotally mounting the shoe to the yoke member with the axis of the pivot being perpendicular to and tangent to the seam of the cable.

7. In combination with apparatus for soldering a longitudinally extending seam between the overlapped edges of a longitudinally advancing tubular article, means for applying a substantially constant holding force on the overlapped edge while the solder hardens, which comprises, a fixed support, an elongated member resiliently mounted on the support, means for varying the degree of resilience of the elongated member on the support, low friction bearings for allowing longitudinal movement of the elongated member on the support toward and away from the article, means for restricting rotational movement of the elongated member on the support, a shoe having a wear-resisting surface for making sliding contact with the overlap portion of the seam, a yoke member mounted to an end of the elongated member, means for pivotally mounting the shoe to the yoke member with the axis of the pivot being perpendicular to and tangent to the seam of the cable, means for positioning the shoe laterally along the yoke, and means for tilting the axis of the pivot with respect to the seam for accurately directing the force of the shoe against the seam.

References Cited in the file of this patent
UNITED STATES PATENTS

| | | |
|---|---|---|
| 2,797,288 | Kiemele et al. | June 25, 1957 |
| 2,801,316 | Hughes | July 30, 1957 |